United States Patent
Khlat et al.

(10) Patent No.: US 10,326,490 B2
(45) Date of Patent: Jun. 18, 2019

(54) MULTI RADIO ACCESS TECHNOLOGY POWER MANAGEMENT CIRCUIT

(71) Applicant: Qorvo US, Inc., Greensboro, NC (US)

(72) Inventors: Nadim Khlat, Cugnaux (FR); Marcus Granger-Jones, Scotts Valley, CA (US); Dirk Robert Walter Leipold, San Jose, CA (US)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 15/902,244

(22) Filed: Feb. 22, 2018

(65) Prior Publication Data

US 2019/0068234 A1 Feb. 28, 2019

Related U.S. Application Data

(60) Provisional application No. 62/552,469, filed on Aug. 31, 2017.

(51) Int. Cl.
*H04B 1/00* (2006.01)
*H04L 1/00* (2006.01)
(Continued)

(52) U.S. Cl.
CPC ....... *H04B 1/40* (2013.01); *H04B 2001/0408* (2013.01); *H04B 2001/0416* (2013.01); *H04W 88/06* (2013.01)

(58) Field of Classification Search
CPC combination set(s) only.
See application file for complete search history.

(56) References Cited

U.S. PATENT DOCUMENTS 5,838,732 A * 11/1998 Carney ............... H04L 27/2602
375/297
7,043,213 B2 5/2006 Robinson et al.
(Continued)

OTHER PUBLICATIONS

Non-Final Office Action for U.S. Appl. No. 14/836,634, dated May 16, 2016, 9 pages.
(Continued)

*Primary Examiner* — Andrew Wendell
(74) *Attorney, Agent, or Firm* — Withrow & Terranova, P.L.L.C.

(57) ABSTRACT

A multi radio access technology (RAT) circuit is provided. The multi RAT power management circuit can concurrently support multiple different RATs using a single power management integrated circuit and a single power amplifier. The multi RAT power management circuit receives a first digital signal modulated based on a first RAT and a second digital signal modulated based on a second RAT. Control circuitry generates a composite output signal, which includes the first digital signal and the second digital signal and corresponds to a time-variant composite signal envelope derived from a respective peak envelope of the first and the second digital signals. The control circuitry generates a voltage control signal having a time-variant target voltage envelope tracking the time-variant composite signal envelope of the composite output signal. As such, the multi RAT power management circuit can concurrently support the multiple different RATs without increasing size, costs, complexity, and/or power consumption.

21 Claims, 4 Drawing Sheets

(51) Int. Cl.
*H04W 52/02* (2009.01)
*H04B 1/40* (2015.01)
*H04B 1/04* (2006.01)
*H04W 88/06* (2009.01)

(56) References Cited

U.S. PATENT DOCUMENTS

| | | | |
|---|---|---|---|
| 7,471,155 | B1 | 12/2008 | Levesque |
| 7,570,931 | B2 | 8/2009 | McCallister et al. |
| 8,461,928 | B2 | 6/2013 | Yahav et al. |
| 8,718,188 | B2 | 5/2014 | Balteanu et al. |
| 8,774,065 | B2 | 7/2014 | Khlat et al. |
| 8,879,665 | B2 | 11/2014 | Xia et al. |
| 8,913,690 | B2 | 12/2014 | Onishi |
| 8,989,682 | B2 | 3/2015 | Ripley et al. |
| 9,041,365 | B2 | 5/2015 | Kay et al. |
| 9,065,509 | B1 | 6/2015 | Yan et al. |
| 9,098,099 | B2 | 8/2015 | Park et al. |
| 9,166,830 | B2 | 10/2015 | Camuffo et al. |
| 9,225,362 | B2 | 12/2015 | Drogi et al. |
| 9,263,997 | B2 | 2/2016 | Vinayak |
| 9,280,163 | B2 | 3/2016 | Kay et al. |
| 9,288,098 | B2 | 3/2016 | Yan et al. |
| 9,344,304 | B1 | 5/2016 | Cohen |
| 9,356,512 | B2 | 5/2016 | Chowdhury et al. |
| 9,515,622 | B2 | 12/2016 | Nentwig et al. |
| 9,520,907 | B2 | 12/2016 | Peng et al. |
| 9,584,071 | B2 | 2/2017 | Khlat |
| 9,595,981 | B2 | 3/2017 | Khlat |
| 9,748,845 | B1 | 8/2017 | Kotikalapoodi |
| 9,806,676 | B2 | 10/2017 | Balteanu et al. |
| 9,831,834 | B2 | 11/2017 | Balteanu et al. |
| 9,923,520 | B1 | 3/2018 | Abdelfattah et al. |
| 2004/0266366 | A1* | 12/2004 | Robinson ............... H03F 1/0222 455/91 |
| 2005/0232385 | A1* | 10/2005 | Yoshikawa .......... H03C 3/0925 375/376 |
| 2009/0045872 | A1 | 2/2009 | Kenington |
| 2011/0136452 | A1 | 6/2011 | Pratt et al. |
| 2011/0279179 | A1* | 11/2011 | Vice ....................... H03G 3/007 330/127 |
| 2012/0194274 | A1 | 8/2012 | Fowers et al. |
| 2012/0200435 | A1 | 8/2012 | Ngo et al. |
| 2013/0021827 | A1 | 1/2013 | Ye |
| 2013/0130724 | A1* | 5/2013 | Kumar Reddy ...... H04W 36/08 455/456.6 |
| 2013/0187711 | A1 | 7/2013 | Goedken et al. |
| 2014/0009226 | A1 | 1/2014 | Severson |
| 2014/0028370 | A1 | 1/2014 | Wimpenny |
| 2014/0103995 | A1* | 4/2014 | Langer .................. H03F 1/0244 330/127 |
| 2014/0155002 | A1 | 6/2014 | Dakshinamurthy et al. |
| 2014/0210550 | A1 | 7/2014 | Mathe et al. |
| 2014/0218109 | A1 | 8/2014 | Wimpenny |
| 2014/0235185 | A1 | 8/2014 | Drogi |
| 2014/0266423 | A1 | 9/2014 | Drogi et al. |
| 2014/0266428 | A1 | 9/2014 | Chiron et al. |
| 2014/0315504 | A1 | 10/2014 | Sakai et al. |
| 2014/0361830 | A1 | 12/2014 | Mathe et al. |
| 2015/0188432 | A1 | 7/2015 | Vannorsdel et al. |
| 2015/0236654 | A1 | 8/2015 | Jiang et al. |
| 2015/0236729 | A1 | 8/2015 | Peng et al. |
| 2015/0280652 | A1 | 10/2015 | Cohen |
| 2015/0333781 | A1 | 11/2015 | Alon et al. |
| 2016/0065137 | A1 | 3/2016 | Khlat |
| 2016/0099687 | A1 | 4/2016 | Khlat |
| 2016/0105151 | A1 | 4/2016 | Langer |
| 2016/0118941 | A1 | 4/2016 | Wang |
| 2016/0187627 | A1 | 6/2016 | Abe |
| 2016/0197627 | A1 | 7/2016 | Qin et al. |
| 2017/0141736 | A1 | 5/2017 | Pratt et al. |
| 2017/0317913 | A1 | 11/2017 | Kim et al. |
| 2017/0338773 | A1 | 11/2017 | Balteanu et al. |
| 2018/0048276 | A1 | 2/2018 | Khlat et al. |
| 2018/0076772 | A1 | 3/2018 | Khesbak et al. |
| 2018/0367101 | A1* | 12/2018 | Chen .................... H03F 1/0227 |

OTHER PUBLICATIONS

Non-Final Office Action for U.S. Appl. No. 14/868,890, dated Jul. 14, 2016, 13 pages.
Non-Final Office Action for U.S. Appl. No. 15/792,909, dated May 18, 2018, 13 pages.
Notice of Allowance for U.S. Appl. No. 15/459,449, dated Mar. 28, 2018, 7 pages.
Notice of Allowance for U.S. Appl. No. 15/723,460, dated Jul. 24, 2018, 8 pages.
Notice of Allowance for U.S. Appl. No. 15/704,131, dated Jul. 17, 2018, 7 pages.
Non-Final Office Action for U.S. Appl. No. 15/888,300, dated Aug. 28, 2018, 11 pages.
Notice of Allowance for U.S. Appl. No. 15/728,202, dated Aug. 2, 2018, 7 pages.
Final Office Action for U.S. Appl. No. 15/888,300, dated Feb. 15, 2019, 15 pages.
Non-Final Office Action for U.S. Appl. No. 15/986,948, dated Mar. 28, 2019, 8 pages.
Non-Final Office Action for U.S. Appl. No. 16/018,426, dated Apr. 11, 2019, 11 pages.
Pfister, Henry, "Discrete-Time Signal Processing," Lecture Note, pfister.ee.duke.edu/courses/ece485/dtsp.pdf, Mar. 3, 2017, 22 pages.
Non-Final Office Action for U.S. Appl. No. 15/888,260, dated May 2, 2019, 14 pages.

* cited by examiner

MULTI RADIO ACCESS TECHNOLOGY POWER MANAGEMENT CIRCUIT

RELATED APPLICATIONS

This application claims the benefit of U.S. Provisional Patent Application Ser. No. 62/552,469, filed on Aug. 31, 2017, which is incorporated herein by reference in its entirety.

FIELD OF THE DISCLOSURE

The technology of the disclosure relates generally to power management in wireless communication devices.

BACKGROUND

Mobile communication devices have become increasingly common in current society. The prevalence of these mobile communication devices is driven in part by the many functions that are now enabled on such devices. Increased processing capabilities in such devices means that mobile communication devices have evolved from being pure communication tools into sophisticated mobile multimedia centers that enable enhanced user experiences.

The redefined user experience requires higher data rates offered by such advanced radio access technology (RAT) as long-term evolution (LTE), fifth-generation new radio (5G-NR), and/or wireless local area network (WLAN, also known as Wi-Fi). To achieve the higher data rates in mobile communication devices, power amplifiers (PAs) may be employed to increase output power of radio frequency (RF) signals (e.g., maintaining sufficient energy per bit) communicated by mobile communication devices.

To support a variety of applications and/or usage scenarios in different geographic regions, the mobile communication devices may need to concurrently support a combination of different RATs in a selected RF spectrum(s). In a conventional power management circuit, a dedicated power management integrated circuit (PMIC) and power amplifier (PA) is commonly used to support a particular RAT. In this regard, it would require a duplication of multiple PIMCs and PAs to concurrently support the combination of different RATs. Notably, the duplication of multiple PMICs and the PAs can lead to increased footprint, costs, complexity, and power consumption of the power management circuit. Thus, it may be desirable to optimize the power management circuit to concurrently support multiple RATs.

SUMMARY

Aspects disclosed in the detailed description include a multi radio access technology (RAT) power management circuit. The multi RAT power management circuit can concurrently support multiple different RATs based on a single power management integrated circuit (PMIC) and a single power amplifier (PA). In examples discussed herein, the multi RAT power management circuit receives a first digital signal modulated based on a first RAT (e.g., long-term evolution (LTE) and a second digital signal modulated based on a second RAT (e.g., fifth-generation new radio (5G-NR)). Control circuitry is configured to generate a composite output signal, which includes the first digital signal and the second digital signal and corresponds to a time-variant composite signal envelope derived from a respective peak envelope of the first digital signal and the second digital signal. The control circuitry also generates a voltage control signal having a time-variant target voltage envelope that tracks the time-variant composite signal envelope of the composite output signal. In a non-limiting example, the voltage control signal is provided to the single PMIC to drive the single PA to amplify the composite output signal for transmission. By sharing the single PMIC and the single PA, it is possible to concurrently support the multiple different RATs without increasing size, costs, complexity, and/or power consumption of the multi RAT power management circuit.

In one aspect, a multi RAT power management circuit is provided. The multi RAT power management circuit includes a first signal input configured to receive a first digital signal modulated based on a first RAT and corresponding to a time-variant first peak envelope. The multi RAT power management circuit also includes a second signal input configured to receive a second digital signal modulated based on a second RAT different from the first RAT and corresponding to a time-variant second peak envelope. The multi RAT power management circuit also includes control circuitry. The control circuitry includes a first signal output and a second signal output. The control circuitry is configured to generate a composite output signal comprising the first digital signal and the second digital signal and corresponding to a time-variant composite signal envelope derived from the time-variant first peak envelope and the time-variant second peak envelope. The control circuitry is also configured to generate a voltage control signal having a time-variant target voltage envelope tracking the time-variant composite signal envelope. The control circuitry is also configured to provide the voltage control signal to the first signal output. The control circuitry is also configured to provide the composite output signal to the second signal output.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure and, together with the description, serve to explain the principles of the disclosure.

DETAILED DESCRIPTION

Figure 1:
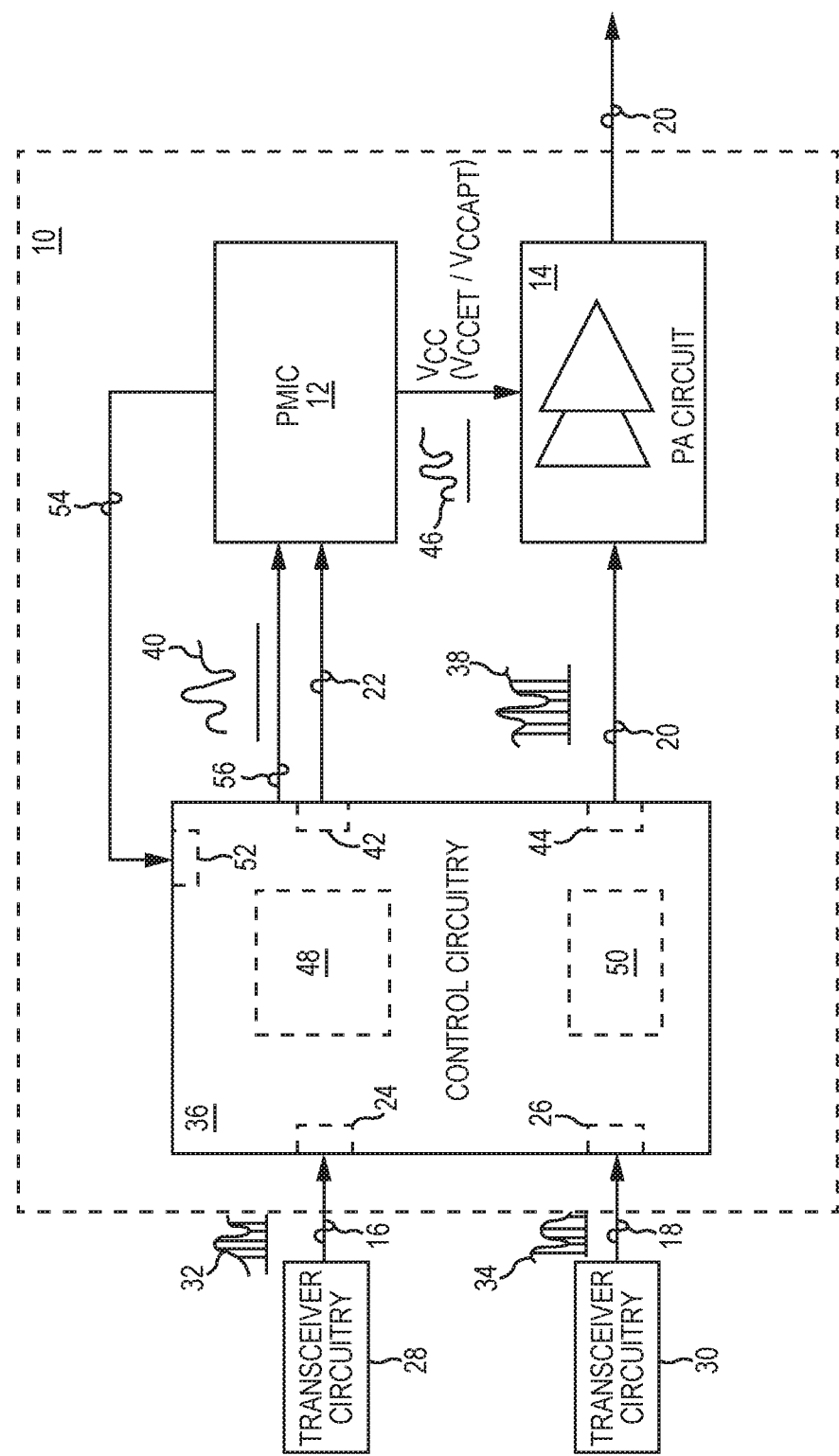
FIG. 1 is a schematic diagram of an exemplary multi radio access technology (RAT) power management circuit configured to concurrently support multiple different RATs by sharing a single power management integrated circuit (PMIC) and a single power amplifier (PA) circuit.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Aspects disclosed in the detailed description include a multi radio access technology (RAT) power management circuit. The multi RAT power management circuit can concurrently support multiple different RATs based on a single power management integrated circuit (PMIC) and a single power amplifier (PA). In examples discussed herein, the multi RAT power management circuit receives a first digital signal modulated based on a first RAT (e.g., long-term evolution (LTE) and a second digital signal modulated based on a second RAT (e.g., fifth-generation new radio (5G-NR)). Control circuitry is configured to generate a composite output signal, which includes the first digital signal and the second digital signal and corresponds to a time-variant composite signal envelope derived from a respective peak envelope of the first digital signal and the second digital signal. The control circuitry also generates a voltage control signal having a time-variant target voltage envelope that tracks the time-variant composite signal envelope of the composite output signal. In a non-limiting example, the voltage control signal is provided to the single PMIC to drive the single PA to amplify the composite output signal for transmission. By sharing the single PMIC and the single PA, it is possible to concurrently support the multiple different RATs without increasing size, costs, complexity, and/or power consumption of the multi RAT power management circuit.

In this regard, FIG. 1 is a schematic diagram of an exemplary multi RAT power management circuit 10 configured to concurrently support multiple different RATs by sharing a single PMIC 12 and a single PA circuit 14. As discussed in detail below, the multi RAT power management circuit 10 is configured to receive and combine a first digital signal 16 and a second digital signal 18, which may be modulated based on different RATs, to generate a composite output signal 20. The multi RAT power management circuit 10 is also configured to generate and provide a voltage control signal 22 to the PMIC 12. In a non-limiting example, the voltage control signal 22 can be a differential voltage control signal including a positive voltage control signal and a negative voltage control signal. The PMIC 12 generates a modulated output voltage $V_{CC}$ based on the voltage control signal 22 and provides the modulated output voltage $V_{CC}$ to the PA circuit 14. The modulated output voltage $V_{CC}$ drives the PA circuit 14 to amplify the composite output signal 20 for transmission in a selected radio frequency (RF) spectrum(s). By sharing the PMIC 12 and the PA circuit 14, it is possible to concurrently support multiple different RATs without increasing size, costs, complexity, and/or power consumption of the multi RAT power management circuit 10.

The multi RAT power management circuit 10 may include a first signal input 24 and a second signal input 26. In a non-limiting example, the first signal input 24 and the second signal input 26 are coupled to first transceiver circuitry 28 and second transceiver circuitry 30, respectively. Notably, the first transceiver circuitry 28 and the second transceiver circuitry 30 can be provided either in an integrated circuit or in separate circuits, without impacting functional aspects of the multi RAT power management circuit 10. The first transceiver circuitry 28 is configured to modulate the first digital signal 16, which can be a digital baseband signal for example, based on a first RAT. Likewise, the second transceiver circuitry 30 is configured to modulate the second digital signal 18, which can also be a digital baseband signal for example, based on a second RAT. Hereinafter, a signal is said to being modulated based on a specific RAT when the signal is modulated based on specific logical characteristics (e.g., modulation and coding scheme) and/or physical characteristics (e.g., resource allocation scheme) of the specific RAT.

The first digital signal 16 corresponds to a time-variant first peak envelope 32 that defines time-variant peak amplitudes of the first digital signal 16. The second digital signal 18 corresponds to a time-variant second peak envelope 34 that defines time-variant peak amplitudes of the second digital signal 18. The multi RAT power management circuit 10 receives the first digital signal 16 and the second digital signal 18 via the first signal input 24 and the second signal input 26, respectively.

The multi RAT power management circuit 10 includes control circuitry 36, which can be a microprocessor, a microcontroller, or a field-programmable gate array (FPGA) for example. In a non-limiting example, the first signal input 24 and the second signal input 26 can be provided inside the control circuitry 36. The control circuitry 36 is configured to generate the composite output signal 20 that includes the first digital signal 16 and the second digital signal 18. As is further discussed later, the control circuitry 36 may generate the composite output signal 20 through digital signal processing, analog signal processing, or a combination of both. The composite output signal 20 corresponds to a time-variant composite signal envelope 38, which is derived from the time-variant first peak envelope 32 of the first digital signal 16 and the time-variant second peak envelope 34 of the second digital signal 18. In this regard, the time-variant composite signal envelope 38 tracks time-variant composite peaks of the time-variant first peak envelope 32 and the time-variant second peak envelope 34.

The control circuitry 36 is further configured to generate the voltage control signal 22, which corresponds to a time-variant target voltage envelope 40 that tracks the time-variant composite signal envelope 38. The control circuitry 36 may include a first signal output 42 and a second signal output 44 coupled to the PMIC 12 and the PA circuit 14, respectively. Accordingly, the control circuitry 36 can provide the voltage control signal 22 and the composite output signal 20 to the PMIC 12 and the PA circuit 14 via the first signal output 42 and the second signal output 44, respectively.

The PMIC 12 is configured to generate the modulated output voltage $V_{CC}$ based on the voltage control signal 22. In this regard, the PMIC 12 generates the modulated output voltage $V_{CC}$ with a time-variant modulated voltage envelope 46 that tracks the time-variant target voltage envelope 40. The PA circuit 14 is configured to amplify the composite output signal 20 for transmission based on the modulated output voltage $V_{CC}$ received from the PMIC 12.

The control circuitry 36 may include voltage control circuitry 48 and signal control circuitry 50. In a non-limiting example, the voltage control circuitry 48 is configured to generate the voltage control signal 22 and provides the voltage control signal 22 to the first signal output 42. The signal control circuitry 50, on the other hand, can be configured to generate the composite output signal and provides the composite output signal 20 to the second signal output 44. The control circuitry 36 may further include a feedback signal input 52. The feedback signal input 52 may be configured to receive a voltage feedback signal 54, which can be proportional to the modulated output voltage $V_{CC}$, from the PMIC 12. The voltage feedback signal 54 allows the control circuitry 36 to adjust the time-variant target voltage envelope 40 based on the modulated output voltage $V_{CC}$, thus making the multi RAT power management circuit 10 a closed-loop power management circuit.

In one non-limiting example, the first RAT can be implemented based on a LTE wireless communication standard(s) and the second RAT can be implemented based on a 5G-NR wireless communication standard(s). Both the LTE wireless communication standard(s) and the 5G-NR wireless communication standard(s) are developed by an international standard organization known as third-generation partnership project (3GPP). Accordingly, the first digital signal 16 is modulated based on the LTE wireless communication standard(s) for transmission in a selected LTE band. Likewise, the second digital signal 18 is modulated based on the 5G-NR wireless communication standard(s) for transmission in a selected 5G-NR band. In one exemplary embodiment, the first digital signal 16 is encoded and modulated to convey control channel information, while the second digital signal 18 is encoded and modulated to convey data channel information.

The multi RAT power management circuit 10 can be configured to support a variety of combinations of the selected LTE band and the selected 5G-NR band. In one example, the first digital signal 16 and the second digital signal 18 can be modulated for transmission in LTE band 71 (B71) and 5G-NR band 71 (N71), respectively. In another example, the first digital signal 16 and the second digital signal 18 can be modulated for transmission in LTE band 41 (B41) and 5G-NR band 41 (N41), respectively. In another example, the first digital signal 16 and the second digital signal 18 can be modulated for transmission in LTE band 42 (B42) and 5G-NR band 78 (N78), respectively. In another example, the first digital signal 16 and the second digital signal 18 can be modulated for transmission in LTE band 42 (B42) and 5G-NR band 77 (N77), respectively. In another example, the first digital signal 16 and the second digital signal 18 can be modulated for transmission in LTE band 3 (B3) and 5G-NR band 80 (N80), respectively. In another example, the first digital signal 16 and the second digital signal 18 can be modulated for transmission in LTE band 8 (B8) and 5G-NR band 81 (N81), respectively. In another example, the first digital signal 16 and the second digital signal 18 can be modulated for transmission in LTE band 20 (B20) and 5G-NR band 82 (N82), respectively. In another example, the first digital signal 16 and the second digital signal 18 can be modulated for transmission in LTE band 28 (B28) and 5G-NR band 83 (N83), respectively. In another example, the first digital signal 16 and the second digital signal 18 can be modulated for transmission in LTE band 1 (B1) and 5G-NR band 84 (N84), respectively. In another example, the first digital signal 16 and the second digital signal 18 can be modulated for transmission in LTE band 41 (B41) and 5G-NR band 85 (N85), respectively.

In another non-limiting example, the first RAT can be implemented based on the LTE wireless communication standard(s) and the second RAT can be implemented based on a WLAN (also known as Wi-Fi) wireless communication standard(s). The WLAN wireless communication standard(s) can be any of one or any combination of 801.11a, 802.11g, 802.11n, or 802.11ac standards developed by the institute of electrical and electronics engineers (IEEE). Accordingly, the first digital signal 16 is modulated based on the LTE wireless communication standard(s) for transmission in a selected LTE band. Likewise, the second digital signal 18 is modulated based on the WLAN wireless communication standard(s) for transmission in a selected WLAN band. For example, the first digital signal 16 and the second digital signal 18 can be modulated for transmission in LTE band 46 (B46) and 5 GHz industrial, scientific, and medical (ISM) band, respectively.

Table 1 below provides a list of RF spectrums of the LTE bands that may be supported by the multi RAT power management circuit 10.

TABLE 1

| LTE Band | LTE Uplink Spectrum |
|---|---|
| B1 | 1920-1980 MHz |
| B3 | 1710-1785 MHz |
| B8 | 880-915 MHz |
| B20 | 832-862 MHz |
| B28 | 703-748 MHz |
| B41 | 2496-2690 MHz |
| B42 | 3400-3600 MHz |
| B46 | 5150-5925 MHz |
| B71 | 663-698 MHz |

Table 2 below provides a list of RF spectrums of the 5G-NR bands that may be supported by the multi RAT power management circuit 10.

TABLE 2

| 5G-NR Band # | 5G-NR Uplink Spectrum |
|---|---|
| N41 | 2496-2690 MHz |
| N71 | 663-698 MHz |
| N77 | 3300-4200 MHz |
| N78 | 3300-3800 MHz |
| N80 | 1710-1785 MHz |
| N81 | 880-915 MHz |
| N82 | 832-862 MHz |
| N83 | 703-748 MHz |
| N84 | 1920-1980 MHz |
| N85 | 2496-2690 MHz |

Notably, in order for the PA circuit 14 to operate with good linearity and high efficiency, the time-variant modulated voltage envelope 46 of the modulated output voltage $V_{CC}$ needs to closely track the time-variant composite signal envelope 38 of the composite output signal 20. To do so, the PMIC 12 needs to support a voltage modulation bandwidth that matches a signal modulation bandwidth of the composite output signal 20. When the voltage modulation bandwidth of the PMIC 12 matches or exceeds the signal modulation bandwidth of the composite output signal 20, the PMIC 12 can operate in an envelope tracking (ET) mode and generate the time-variant modulated output voltage $V_{CC}$ as a time-variant ET modulated output voltage. As such, the PA circuit 14, which operates based on the time-variant ET modulate output voltage, can amplify the composite output signal 20 with high PA efficiency.

However, the PMIC 12 may have a limited voltage modulation bandwidth that is often lower than the signal modulation bandwidth of the composite output signal 20. As a result, the PMIC 12 can only operate in an average power tracking (APT) mode and generate the time-variant modulated output voltage $V_{CC}$ as a time-variant APT modulated output voltage.

In this regard, the control circuitry 36 is further configured to monitor the signal modulation bandwidth of the composite output signal 20 to determine whether to configure the PMIC 12 to operate in the ET mode or the APT mode. More specifically, the control circuitry 36 compares the signal modulation bandwidth of the composite output signal 20 against a defined bandwidth threshold. In a non-limiting example, the defined bandwidth threshold can be between 60-100 MHz.

When the control circuitry 36 determines that the signal modulation bandwidth of the composite output signal 20 is less than the defined bandwidth threshold, the control circuitry 36 generates the voltage control signal 22 having a time-variant ET modulated target voltage envelope. Accordingly, the PMIC 12 generates a time-variant ET modulated output voltage $V_{CCET}$ having a time-variant ET modulated voltage envelope tracking the time-variant ET modulated target voltage envelope. The PA circuit 14, in turn, amplifies the composite output signal 20 based on the time-variant ET modulated output voltage $V_{CCET}$.

In contrast, when the control circuitry 36 determines that the signal modulation bandwidth of the composite output signal 20 is greater than or equal to the defined bandwidth threshold, the control circuitry 36 generates the voltage control signal 22 having a time-variant APT modulated target voltage envelope. Accordingly, the PMIC 12 generates a time-variant APT modulated output voltage $V_{CCAPT}$ having a time-variant APT modulated voltage envelope tracking the time-variant APT modulated target voltage envelope. The PA circuit 14, in turn, amplifies the composite output signal 20 based on the time-variant APT modulated output voltage $V_{CCAPT}$.

The control circuitry 36 may configure and/or control the PMIC 12 via a PMIC control signal 56. In a non-limiting example, the control circuitry 36 can be configured to provide the PMIC control signal 56 to the PMIC 12 via MIPI Alliance RF Front-End Interface (RFFE). In one example, the PMIC control signal 56 can convey total power control (TPC) information related to the first digital signal 16 and the second digital signal 18. The PMIC 12, in turn, may use the TPC information in conjunction with the time-variant composite signal envelope 38 of the composite output signal 20 to generate the time-variant ET modulated output voltage $V_{CCET}$ or the time-variant APT modulated output voltage $V_{CCAPT}$.

Figure 2:
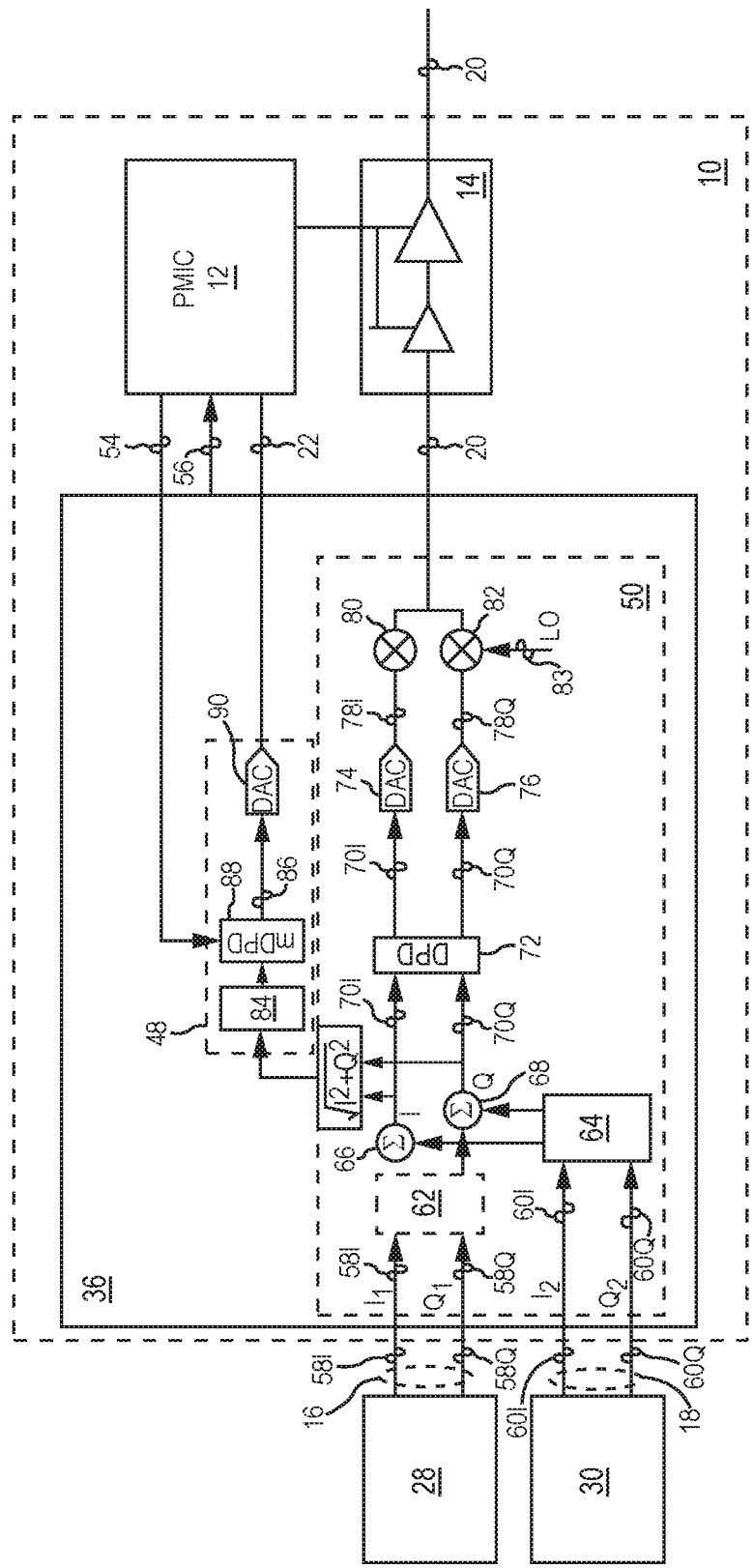
FIG. 2 is a schematic diagram providing an exemplary illustration of control circuitry that controls the multi RAT power management circuit of FIG. 1.

The control circuitry 36 may generate the composite output signal 20 via digital signal processing. In this regard, FIG. 2 is a schematic diagram providing an exemplary illustration of the control circuitry 36 of FIG. 1. Common elements between FIGS. 1 and 2 are shown therein with common element numbers and will not be re-described herein. Notably, the control circuitry 36 as shown in FIG. 2 may have omitted certain active and/or passive components/circuitries for the sake of simplicity. It should be appreciated that additional components/circuitries may be added to the control circuitry 36 without affecting operational principles discussed herein.

In a non-limiting example, each of the first digital signal 16 and the second digital signal 18 includes a respective in-phase component and a respective quadrature component with a ninety degree (90°) phase offset from the in-phase component. In this regard, the first digital signal 16 includes a first digital in-phase signal 58I and a first digital quadrature signal 58Q. Likewise, the second digital signal 18 includes a second digital in-phase signal 60I and a second digital quadrature signal 60Q. The first digital in-phase signal 58I and the first digital quadrature signal 58Q correspond to a first in-phase amplitude $I_1$ and a first quadrature amplitude $Q_1$, respectively. The second digital in-phase signal 60I and the second digital quadrature signal 60Q correspond to a second in-phase amplitude $I_2$ and a second quadrature amplitude $Q_2$, respectively.

In one embodiment, the first transceiver circuitry 28 generates and provides the first digital in-phase signal 58I and the first digital quadrature signal 58Q to the signal control circuitry 50, while the second transceiver circuitry 30 generates and provides the second digital in-phase signal 60I and the second digital quadrature signal 60Q to the signal control circuitry 50. In another embodiment, the signal control circuitry 50 can be configured to include an in-phase/quadrature (I/Q) signal converter(s) to convert the first digital signal 16 into the first digital in-phase signal 58I and the first digital quadrature signal 58Q, and to convert the second digital signal 18 into the second digital in-phase signal 60I and the second digital quadrature signal 60Q.

The signal control circuitry 50 may include a first frequency shifter 62 configured to shift the first digital in-phase signal 58I and the first digital quadrature signal 58Q to a first intermediate frequency (IF). Likewise, the signal control circuitry 50 may include a second frequency shifter 64 configured to shift the second digital in-phase signal 60I and the second digital quadrature signal 60Q to a second IF. The first IF and the second IF may be contiguous or non-contiguous, without overlapping each other.

The signal control circuitry 50 may include a first combiner 66 and a second combiner 68. The first combiner 66 combines the first digital in-phase signal 58I and the second digital in-phase signal 60I to generate a composite digital in-phase signal 70I. The composite digital in-phase signal 70I has a composite in-phase amplitude I that equals a sum of the first in-phase amplitude $I_1$ and the second in-phase amplitude $I_2$ ($I=I_1+I_2$). The second combiner 68 combines the first digital quadrature signal 58Q and the second digital quadrature signal 60Q to generate a composite digital quadrature signal 70Q. The composite digital quadrature signal 70Q has a composite quadrature amplitude Q that equals a sum of the first quadrature amplitude $Q_1$ and the second quadrature amplitude $Q_2$ ($Q=Q_1+Q_2$).

The signal control circuitry 50 may include digital pre-distortion (DPD) circuitry 72 to digitally pre-distort the composite digital in-phase signal 70I and the composite digital quadrature signal 70Q. The signal control circuitry 50 may include a first digital-to-analog converter (DAC) 74 and a second DAC 76 for converting the composite digital in-phase signal 70I and the composite digital quadrature signal 70Q into a composite analog in-phase signal 78I and a composite analog quadrature signal 78Q, respectively. The signal control circuitry 50 may include a first frequency modulator 80 and a second frequency modulator 82 for modulating the composite analog in-phase signal 78I and the composite analog quadrature signal 78Q based on a local oscillator (LO) signal 83. Subsequently, the signal control circuitry 50 combines the composite analog in-phase signal 78I and the composite analog quadrature signal 78Q to generate the composite output signal 20.

The voltage control circuitry 48 includes look-up table (LUT) circuitry 84. The LUT circuitry 84 is configured to generate a time-variant digital target voltage envelope 86 that tracks the time-variant composite signal envelope 38 of the composite output signal 20. In a non-limiting example the time-variant digital target voltage envelope 86 can be derived from the composite in-phase amplitude I of the composite digital in-phase signal 70I and the composite quadrature amplitude Q of the composite digital quadrature signal 70Q based on equation (Eq. 1) below.

$$\text{Digital Target Voltage Envelope} = \sqrt{I^2 + Q^2} \quad \text{(Eq. 1)}$$

The voltage control circuitry 48 may include memory DPD (mDPD) circuitry 88 to pre-distort the time-variant digital target voltage envelope 86 to compensate for nonlinearity associated with the PMIC 12. The voltage control circuitry 48 may include a voltage DAC 90 for converting the time-variant digital target voltage envelope 86 into the time-variant target voltage envelope 40 in the voltage control signal 22.

Figure 3:
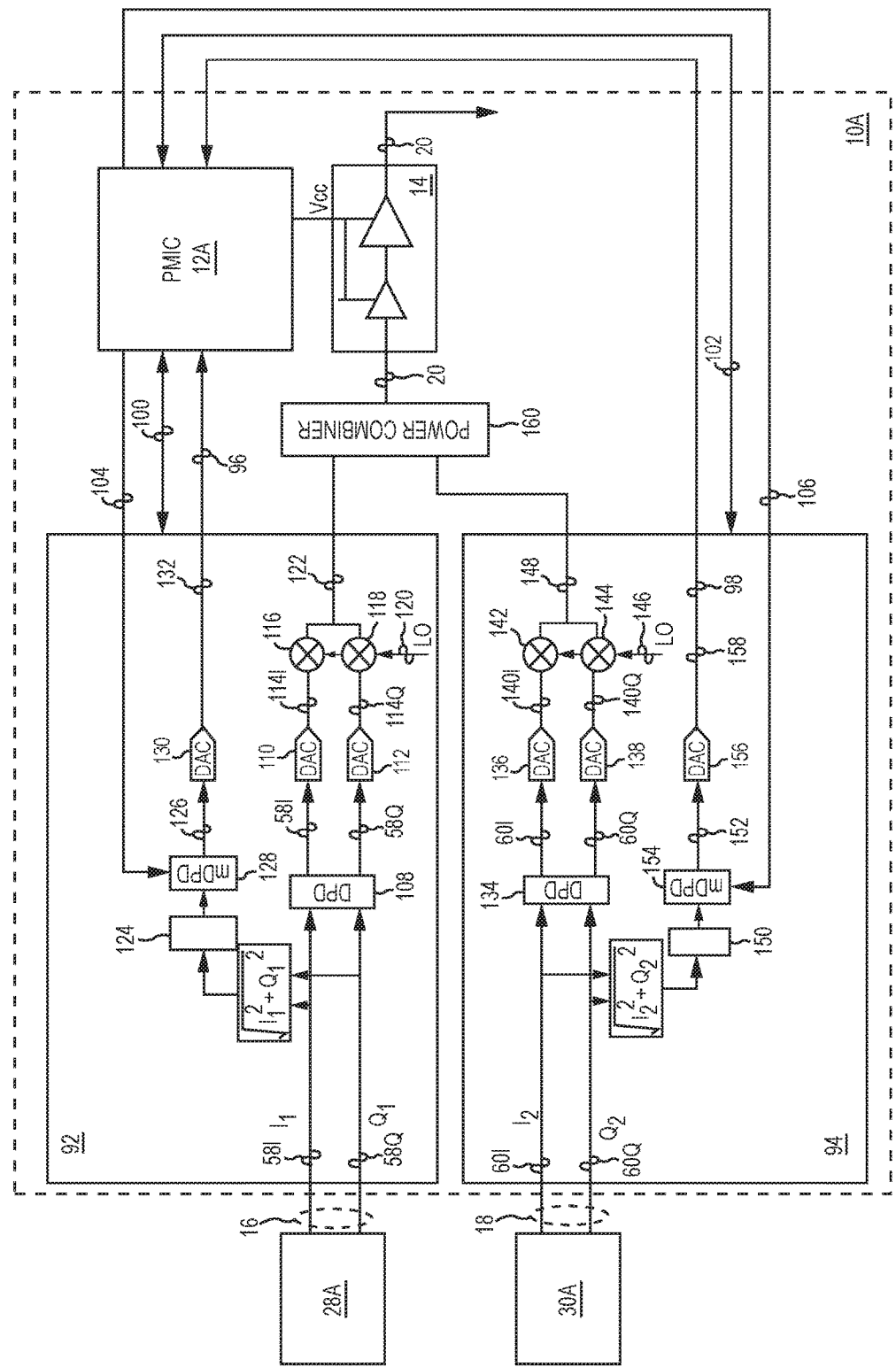
FIG. 3 is a schematic diagram of an exemplary multi RAT power management circuit configured according to an alternative embodiment of the present disclosure.

As previously mentioned, the first transceiver circuitry 28 and the second transceiver circuitry 30 may be provided in separate circuits, which may be made by different vendors. As such, it may be difficult to perform digital I/Q processing on the first digital signal 16 and the second digital signal 18 in the signal control circuitry 50 as described above. In this regard, FIG. 3 is a schematic diagram of an exemplary multi RAT power management circuit 10A according to an alternative embodiment of the present disclosure. Common elements between FIGS. 1, 2, and 3 are shown therein with common element numbers and will not be re-described herein.

The multi RAT power management circuit 10A includes first control circuitry 92 and second control circuitry 94. The first control circuitry 92 is coupled to first transceiver circuitry 28A and configured to process the first digital signal 16 and generate a first voltage control signal 96. The second control circuitry 94 is coupled to second transceiver circuitry 30A and configured to process the second digital signal 18 and generate a second voltage control signal 98. The multi RAT power management circuit 10A includes a PMIC 12A configured to generate the modulated output voltage $V_{CC}$ based on the first voltage control signal 96 and the second voltage control signal 98. The first control circuitry 92 controls the PMIC 12A via a first PMIC control signal 100 and the second control circuitry 94 controls the PMIC 12A via a second PMIC control signal 102. Both the first PMIC control signal 100 and the second PMIC control signal 102 can be based on the MIPI Alliance RFFE. Like the PMIC 12 in FIGS. 1 and 2, the PMIC 12A provides a first voltage feedback signal 104 and a second voltage feedback signal 106 to the first control circuitry 92 and the second control circuitry 94, respectively. In this regard, the multi RAT power management circuit 10A is a closed-loop power management circuit.

The first control circuitry 92 may include first DPD circuitry 108 to digitally pre-distort the first digital in-phase signal 58I and the first digital quadrature signal 58Q. The first control circuitry 92 may include a first DAC 110 and a second DAC 112 for converting the first digital in-phase signal 58I and the first digital quadrature signal 58Q into a first analog in-phase signal 114I and a first analog quadrature signal 114Q, respectively. The first control circuitry 92 may include a first frequency modulator 116 and a second frequency modulator 118 for modulating the first analog in-phase signal 114I and the first analog quadrature signal 114Q based on a first LO signal 120. Subsequently, the first control circuitry 92 combines the first analog in-phase signal 114I and the first analog quadrature signal 114Q to generate a first composite output signal 122.

The first control circuitry 92 includes first LUT circuitry 124. The first LUT circuitry 124 is configured to generate a time-variant first digital target voltage envelope 126. In a non-limiting example, the time-variant first digital target voltage envelope 126 can be derived from the first in-phase amplitude $I_1$ and the first quadrature amplitude $Q_1$ based on equation (Eq. 2) below.

$$\text{First Digital Target Voltage Envelope} = \sqrt{I_1^2 + Q_1^2} \quad \text{(Eq. 2)}$$

The first control circuitry 92 may include first mDPD circuitry 128 to pre-distort the time-variant first digital target voltage envelope 126 to compensate for nonlinearity associated with the PMIC 12A. The first control circuitry 92 may include a first voltage DAC 130 for converting the time-variant first digital target voltage envelope 126 into a time-variant first target voltage envelope 132 in the first voltage control signal 96.

The second control circuitry 94 may include second DPD circuitry 134 to digitally pre-distort the second digital in-phase signal 60I and the second digital quadrature signal 60Q. The second control circuitry 94 may include a third DAC 136 and a fourth DAC 138 for converting the second digital in-phase signal 60I and the second digital quadrature signal 60Q into a second analog in-phase signal 140I and a second analog quadrature signal 140Q, respectively. The second control circuitry 94 may include a third frequency modulator 142 and fourth frequency modulator 144 for modulating the second analog in-phase signal 140I and the second analog quadrature signal 140Q based on a second LO signal 146. Subsequently, the second control circuitry 94 combines the second analog in-phase signal 140I and the second analog quadrature signal 140Q to generate a second composite output signal 148.

The second control circuitry 94 includes second LUT circuitry 150. The second LUT circuitry 150 is configured to generate a time-variant second digital target voltage envelope 152. In a non-limiting example, the time-variant second digital target voltage envelope 152 can be derived from the second in-phase amplitude $I_2$ and the second quadrature amplitude $Q_2$ based on equation (Eq. 3) below.

$$\text{Second Digital Target Voltage Envelope} = \sqrt{I_2^2 + Q_2^2} \quad \text{(Eq. 3)}$$

The second control circuitry 94 may include second mDPD circuitry 154 to pre-distort the time-variant second digital target voltage envelope 152 to compensate for non-linearity associated with the PMIC 12A. The second control circuitry 94 may include a second voltage DAC 156 for converting the time-variant second digital target voltage envelope 152 into a time-variant second target voltage envelope 158 in the second voltage control signal 98.

The multi RAT power management circuit 10A includes power combiner circuitry 160. The power combiner circuitry 160 is configured to combine the first composite output signal 122 and the second composite output signal 148 to generate the composite output signal 20.

Figure 4:
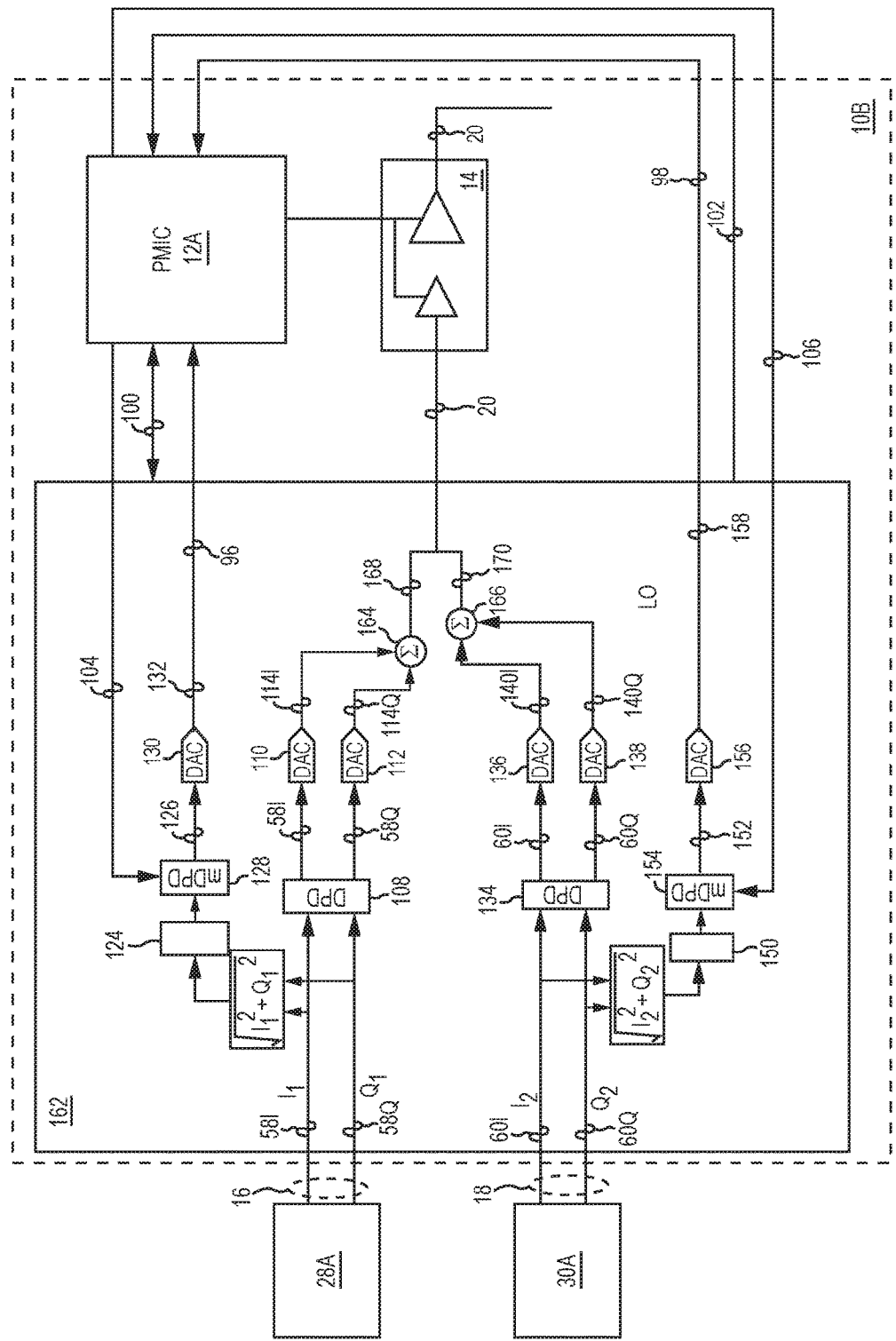
FIG. 4 is a schematic diagram of an exemplary multi RAT power management circuit configured according to another alternative embodiment of the present disclosure.

FIG. 4 is a schematic diagram of an exemplary multi RAT power management circuit 10B according to another alternative embodiment of the present disclosure. Common elements between FIGS. 3 and 4 are shown therein with common element numbers and will not be re-described herein.

The multi RAT power management circuit 10B includes control circuitry 162. The control circuitry 162 includes a first analog combiner 164 and a second analog combiner 166. The first analog combiner 164 combines the first analog in-phase signal 114I and the first analog quadrature signal 114Q to generate a first composite analog signal 168. The second analog combiner 166 combines the second analog in-phase signal 140I and the second analog quadrature signal 140Q to generate a second composite analog signal 170. The first composite analog signal 168 and the second composite analog signal 170 are subsequently combined to form the composite output signal 20.

Those skilled in the art will recognize improvements and modifications to the embodiments of the present disclosure. All such improvements and modifications are considered within the scope of the concepts disclosed herein and the claims that follow.

What is claimed is:

1. A multi radio access technology (RAT) power management circuit comprising:
    a first signal input configured to receive a first digital signal modulated based on a first RAT and corresponding to a time-variant first peak envelope;
    a second signal input configured to receive a second digital signal modulated based on a second RAT different from the first RAT and corresponding to a time-variant second peak envelope; and
    control circuitry comprising a first signal output and a second signal output, the control circuitry is configured to:
        generate a composite output signal comprising the first digital signal and the second digital signal and corresponding to a time-variant composite signal envelope derived from the time-variant first peak envelope and the time-variant second peak envelope;
        generate a voltage control signal having a time-variant target voltage envelope tracking the time-variant composite signal envelope;
        provide the voltage control signal to the first signal output; and
        provide the composite output signal to the second signal output.

2. The multi RAT power management circuit of claim 1 further comprising:
    a power management integrated circuit (PMIC) configured to receive the voltage control signal from the control circuitry and generate a modulated output voltage having a time-variant modulated voltage envelope tracking the time-variant target voltage envelope; and
    a power amplifier (PA) circuit configured to amplify the composite output signal based on the modulated output voltage.

3. The multi RAT power management circuit of claim 2 wherein:
    the control circuitry is further configured to generate the voltage control signal having a time-variant envelope tracking (ET) modulated target voltage envelope in response to the composite output signal having a signal modulation bandwidth less than a defined bandwidth threshold;
    the PMIC is further configured to generate an ET modulated output voltage having a time-variant ET modulated voltage envelope tracking the time-variant ET modulated target voltage envelope; and
    the PA circuit is further configured to amplify the composite output signal based on the ET modulated output voltage.

4. The multi RAT power management circuit of claim 2 wherein:
    the control circuitry is further configured to generate the voltage control signal having a time-variant average power tracking (APT) modulated target voltage envelope in response to the composite output signal having a signal modulation bandwidth greater than or equal to a defined bandwidth threshold;
    the PMIC is further configured to generate an APT modulated output voltage having a time-variant APT modulated voltage envelope tracking the time-variant APT modulated target voltage envelope; and
    the PA circuit is further configured to amplify the composite output signal based on the APT modulated output voltage.

5. The multi RAT power management circuit of claim 1 wherein:
    the first RAT is long-term evolution (LTE) and the first digital signal is modulated in a selected LTE band; and
    the second RAT is fifth-generation new radio (5G-NR) and the second digital signal is modulated in a selected 5G-NR band.

6. The multi RAT power management circuit of claim 5 wherein the first digital signal is modulated in LTE band 71 and the second digital signal is modulated in 5G-NR band 71.

7. The multi RAT power management circuit of claim 5 wherein the first digital signal is modulated in LTE band 41 and the second digital signal is modulated in 5G-NR band 41.

8. The multi RAT power management circuit of claim 5 wherein the first digital signal is modulated in LTE band 42 and the second digital signal is modulated in 5G-NR band 78.

9. The multi RAT power management circuit of claim 5 wherein the first digital signal is modulated in LTE band 42 and the second digital signal is modulated in 5G-NR band 77.

10. The multi RAT power management circuit of claim 5 wherein the first digital signal is modulated in LTE band 3 and the second digital signal is modulated in 5G-NR band 80.

11. The multi RAT power management circuit of claim 5 wherein the first digital signal is modulated in LTE band 8 and the second digital signal is modulated in 5G-NR band 81.

12. The multi RAT power management circuit of claim 5 wherein the first digital signal is modulated in LTE band 20 and the second digital signal is modulated in 5G-NR band 82.

13. The multi RAT power management circuit of claim 5 wherein the first digital signal is modulated in LTE band 28 and the second digital signal is modulated in 5G-NR band 83.

14. The multi RAT power management circuit of claim 5 wherein the first digital signal is modulated in LTE band 1 and the second digital signal is modulated in 5G-NR band 84.

15. The multi RAT power management circuit of claim 5 wherein the first digital signal is modulated in LTE band 41 and the second digital signal is modulated in 5G-NR band 85.

16. The multi RAT power management circuit of claim 1 wherein:
the first RAT is long-term evolution (LTE) and the first digital signal is modulated in a selected LTE band; and
the second RAT is wireless local area network (WLAN) and the second digital signal is modulated in a selected WLAN band.

17. The multi RAT power management circuit of claim 16 wherein the first digital signal is modulated in LTE band 46 and the second digital signal is modulated in 5 GHz industrial, scientific, and medical (ISM) band.

18. The multi RAT power management circuit of claim 1 wherein the control circuitry comprises:
voltage control circuitry configured to generate and provide the voltage control signal to the first signal output; and
signal control circuitry configured to generate and provide the composite output signal to the second signal output.

19. The multi RAT power management circuit of claim 18 wherein:
the first digital signal comprises a first digital in-phase signal and a first digital quadrature signal; and
the second digital signal comprises a second digital in-phase signal and a second digital quadrature signal.

20. The multi RAT power management circuit of claim 19 wherein the signal control circuitry is further configured to:
combine the first digital in-phase signal and the second digital in-phase signal to generate a composite digital in-phase signal;
combine the first digital quadrature signal and the second digital quadrature signal to generate a composite digital quadrature signal; and
generate the composite output signal based on the composite digital in-phase signal and the composite digital quadrature signal.

21. The multi RAT power management circuit of claim 20 wherein:
the first RAT is long-term evolution (LTE) and the first digital signal is modulated in a selected LTE band; and
the second RAT is fifth-generation new radio (5G-NR) and the second digital signal is modulated in a selected 5G-NR band.

* * * * *